United States Patent
Shehata et al.

(10) Patent No.: US 10,438,561 B2
(45) Date of Patent: Oct. 8, 2019

(54) PANEL OVERDRIVE COMPENSATION

(71) Applicant: Apple Inc., Cupertino, CA (US)

(72) Inventors: Shereef Shehata, San Ramon, CA (US); Christopher P. Tann, San Jose, CA (US); Guy Côté, Aptos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/842,383

(22) Filed: Dec. 14, 2017

(65) Prior Publication Data

US 2019/0189082 A1  Jun. 20, 2019

(51) Int. Cl.
    *G09G 5/06*     (2006.01)
    *G09G 5/39*     (2006.01)
    *G06T 11/00*    (2006.01)
    *G06T 3/40*     (2006.01)

(52) U.S. Cl.
    CPC .............. *G09G 5/06* (2013.01); *G06T 11/001* (2013.01); *G09G 2330/045* (2013.01)

(58) Field of Classification Search
    USPC ......................................................... 345/601
    See application file for complete search history.

(56) References Cited

U.S. PATENT DOCUMENTS

| | | | |
|---|---|---|---|
| 2005/0068343 A1* | 3/2005 | Pan .................... | G09G 3/3648 345/690 |
| 2005/0146495 A1* | 7/2005 | MacKinnon ........ | G09G 3/3611 345/98 |
| 2005/0184948 A1* | 8/2005 | Halfant ............... | G09G 3/3648 345/98 |
| 2006/0044618 A1* | 3/2006 | Mizoguchi .......... | G09G 3/3611 358/3.23 |
| 2009/0002400 A1* | 1/2009 | Ha ...................... | G09G 3/3406 345/690 |
| 2009/0079714 A1* | 3/2009 | Shih ................... | G09G 3/2092 345/204 |
| 2012/0056908 A1* | 3/2012 | Yang .................. | G09G 3/3611 345/690 |
| 2013/0002618 A1* | 1/2013 | Furihata ............. | G09G 5/363 345/204 |
| 2015/0194119 A1* | 7/2015 | Ahn .................... | G09G 3/3696 345/213 |
| 2015/0228055 A1* | 8/2015 | Schutten ............ | G09G 3/36 345/606 |
| 2017/0025077 A1* | 1/2017 | Choi ................... | G09G 3/3607 |

* cited by examiner

*Primary Examiner* — Wesner Sajous
(74) *Attorney, Agent, or Firm* — Fletcher Yoder P.C.

(57) ABSTRACT

Systems and methods for interpolating overdrive values using a lookup table to compensate for potential display artifacts. Interpolating includes applying a first interpolation type to a first portion of the lookup table when a point to be interpolated is in the first portion of the lookup table. However, interpolating includes applying a second interpolation type to a second portion of the lookup table when the point to be interpolated is in the second portion of the lookup table. The interpolated values are then used to drive pixels of a display panel.

22 Claims, 15 Drawing Sheets

|       | ARRIVAL GREY LEVEL |    |    |    |     |     |     |     |     |
|-------|----|----|----|----|-----|-----|-----|-----|-----|
|       |    | 0  | 32 | 64 | 96  | 128 | 160 | 192 | 224 | 256 |
|       | 0  | 0  | +2 | +8 | +14 | +16 | +15 | +8  | +2  | 0 |
|       | 32 | 0  | 0  | +4 | +11 | +13 | +13 | +6  | +1  | 0 |
|       | 64 | 0  | -4 | 0  | +5  | +7  | +8  | +4  | +0  | 0 |
| START | 96 | 0  | -3 | -6 | 0   | +4  | +5  | +1  | 0   | 0 |
| GREY  | 128| 0  | -2 | -8 | -8  | 0   | +2  | 0   | 0   | 0 |
| LEVEL | 160| 0  | -1 | -11| -13 | -7  | 0   | 0   | 0   | 0 |
|       | 192| 0  | -1 | -12| -15 | -11 | -5  | 0   | 0   | 0 |
|       | 224| 0  | -1 | -14| -20 | .16 | -9  | -5  | 0   | 0 |
|       | 256| 0  | -1 | -18| -28 | -23 | -14 | -9  | -4  | 0 |

PANEL OVERDRIVE COMPENSATION

BACKGROUND

The present disclosure relates generally to techniques to compensate for motion blur by overdriving pixel values. More specifically, the present disclosure relates generally to techniques for interpolating overcompensation values from a lookup table (LUT).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic display panels are used in a plethora of electronic devices. These display panels typically include multiple pixels that emit light. The pixels may be formed using self-emissive units (e.g., light emitting diode) or pixels that utilize units that are backlit (e.g., liquid crystal diode). When the pixels are used to display a moving object, motion blur may occur due to grey-to-grey transition times. However, this motion blur may also interact with compensation running on the display panel to cause tails or other artifacts in addition to or in place of the motion blur. Overdrive compensation may be used to reduce motion blur and/or related artifacts, but overdrive compensation values may utilize a large (e.g., 100×100) LUT that cause static power leakages and consume large areas of the display or may use a smaller LUT (e.g., 9×9) that may cause potential leakage between positive and negative overdrive values.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Overdrive compensation may be used to reduce artifacts (e.g., due to motion blur or motion-blur-related compensation artifacts) by overdriving pixel values for a current frame based on a change from the pixel values of a previous frame. When overdrive compensation is utilized in high refresh rate panels, for each pixel, a comparison of the pixel grey step value from the previous frame to the current frame is used to estimate an amount of overdrive (e.g., either positive or negative) used at the current pixel location.

It may not be practical to implement LUTs having a size equal to a number of greyscale values (e.g., 256×256). For instance, large LUTs (e.g., anything larger than a 33×33 LUT) may be impractical due to static power leakage and area factors. Thus, interpolation may compute overdrive values by using smaller LUTs (e.g., 33×33 or smaller LUTs) by using index key values between which intervening values may be interpolated.

Barycentric interpolation may be used at around/near the diagonal of the overdrive LUT that functions as a boundary between positive overdrive values and negative overdrive values. Bilinear interpolation may be used further away from the diagonal. This hybrid interpolation scheme may enable utilization of a single LUT to store values that correspond to positive and negative overdrive values without risking leakage between the positive and negative overdrive values due to interpolation. The hybrid interpolation scheme also enable simpler and/or more accurate interpolation away from the diagonal by using bilinear interpolation.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
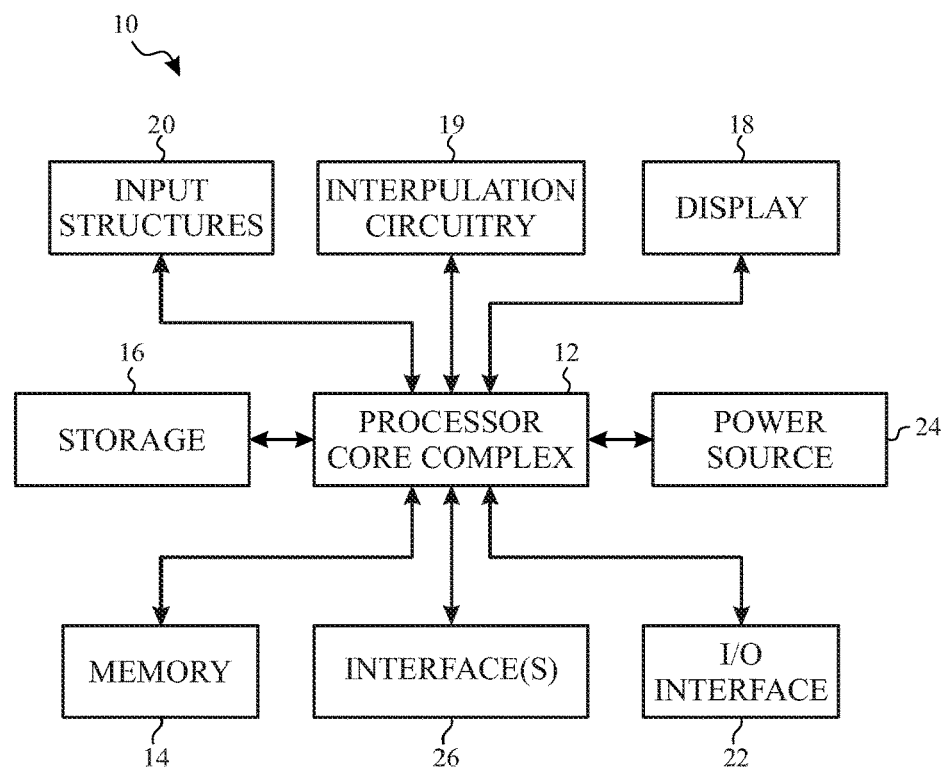
FIG. 1 is a schematic block diagram of an electronic device including a display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Motion blur occurs on liquid crystal diode (LCD) and/or organic light emitting diode (OLED) panels due to slow grey-to-grey transition times. The motion blur may cause problems with and/or interact color compensation algorithms (e.g., aging and/or temperature compensation algorithms). For example, the other compensation may tend to move content to warmer white points that result in artifacts (e.g., red shadow/tail) when scrolling perceptually neutral content with sharp transitions (e.g., black text on white background).

Overdrive compensation may be used to reduce these artifacts by overdriving the pixel values for the current frame based on the pixel values of the previous frame. When overdrive compensation is utilized in high refresh rate panels, for each pixel, a comparison of the pixel grey step value from the previous frame to the current frame is used to estimate an amount of overdrive (e.g., either positive or negative) used at the current pixel location.

Panel overdrive compensation may be used in an on-chip memory configuration (e.g., static random access memory SRAM) in the form of an N×N LUT, where N may be significantly less than (2^Bit_width), where the Bit_width is the bit width of the pixel data. It may not be practical to implement large LUTs (e.g., anything larger than a 33×33 LUT) due to static power leakage and area factors. Thus, interpolation may be used to increase in the performance in the overdrive computations using smaller LUTs (e.g., 33×33 or smaller LUTs).

Interpolation may include bilinear interpolation of two-dimensional LUTs. However, for overdrive interpolation, the bilinear interpolation may cause incorrect interpolation (e.g., leakage) regarding from positive overdrive values and negative overdrive values along a diagonal of the LUT when positive and negative values are included in a single table. Alternatively, to avoid such possible incorrect interpolation, the LUTs may be separated increasing a size of a LUT up to doubling the LUT size and complicating the interpolation process and LUT access.

Interpolation modeling may instead utilize a simplex-based interpolation, such as barycentric interpolation to ensure that positive values are obtained when positive values are proper and that negative values are obtained when negative values are proper. However, triangular/barycentric interpolation may underperform bilinear interpolation away from the LUT diagonal. Alternatively, a more complex splice interpolation may be used, but these methods add to the complexity of the LUT SRAM design and add additional read ports to the SRAM that could significantly increase the leakage as well as dynamic power of the interpolation process.

Instead, a barycentric interpolation may be used around/near the diagonal of the overdrive LUT while bilinear interpolation may be used further away from the diagonal. This hybrid interpolation scheme may enable utilization of a single LUT to store values that correspond to positive and negative overdrive values without risking leakage between the positive and negative overdrive values due to interpolation. The hybrid interpolation scheme also enable simpler and/or more accurate interpolation away from the diagonal by using bilinear interpolation.

With the foregoing in mind and referring first to FIG. 1, an electronic device 10 according to an embodiment of the present disclosure may include, among other things, a processor core complex 12, memory 14, nonvolatile storage 16, a display 18, input structures 20, an input/output (I/O) interface 22, a power source 24, and interface(s) 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

The processor core complex 12 may include one or more cores in one or more processors. In the electronic device 10 of FIG. 1, the processor core complex 12 and/or other data processing circuitry may be operably coupled with the memory 14 and the nonvolatile storage 16 to perform various algorithms. Such programs or instructions, including those for executing the techniques described herein, executed by the processor core complex 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and/or optical discs. Also, programs (e.g., an operating system) encoded on such a computer program product may also include instructions that may be executed by the processor core complex 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels. The electronic device 10 may also include interpolation circuitry 19 that is used to determine how to drive (e.g., overdrive) the display 18 based on current parameters (e.g., temperature, refresh rate) of the display, previous image data, and/or current image data. The interpolation circuitry 19 may be implemented in the display 18, the processor core complex 12, the memory 14, the storage 16, and/or separate circuitry.

The input structures 20 of the electronic device 10 may enable a user to interact with the electronic device 10 (e.g., pressing a button to increase or decrease a volume level, a camera to record video or capture images). The I/O interface 22 may enable the electronic device 10 to interface with various other electronic devices. Additionally or alternatively, the I/O interface 22 may include various types of ports that may be connected to cabling. These ports may include standardized and/or proprietary ports, such as USB, RS232, APPLE'S LIGHTNING® connector, as well as one or more ports for a conducted RF link.

As further illustrated, the electronic device 10 may include the power source 24. The power source 24 may include any suitable source of power, such as a rechargeable lithium polymer (e.g., Li-poly) battery and/or an alternating current (e.g., AC) power converter. The power source 24 may be removable, such as a replaceable battery cell.

The interface(s) 26 enable the electronic device 10 to connect to one or more network types. The interface(s) 26 may also include, for example, interfaces for a personal area network (e.g., PAN), such as a BLUETOOTH network, for a local area network (e.g., LAN) or wireless local area network (e.g., WLAN), such as an 802.11 Wi-Fi network or an 802.15.4 network, and/or for a wide area network (e.g., WAN), such as a 3rd generation (e.g., 3G) cellular network, 4th generation (e.g., 4G) cellular network, or long term evolution (e.g., LTE) cellular network. The interface(s) 26 may also include interfaces for, for example, broadband fixed wireless access networks (e.g., WiMAX), mobile broadband Wireless networks (e.g., mobile WiMAX), and so forth.

Figure 2:
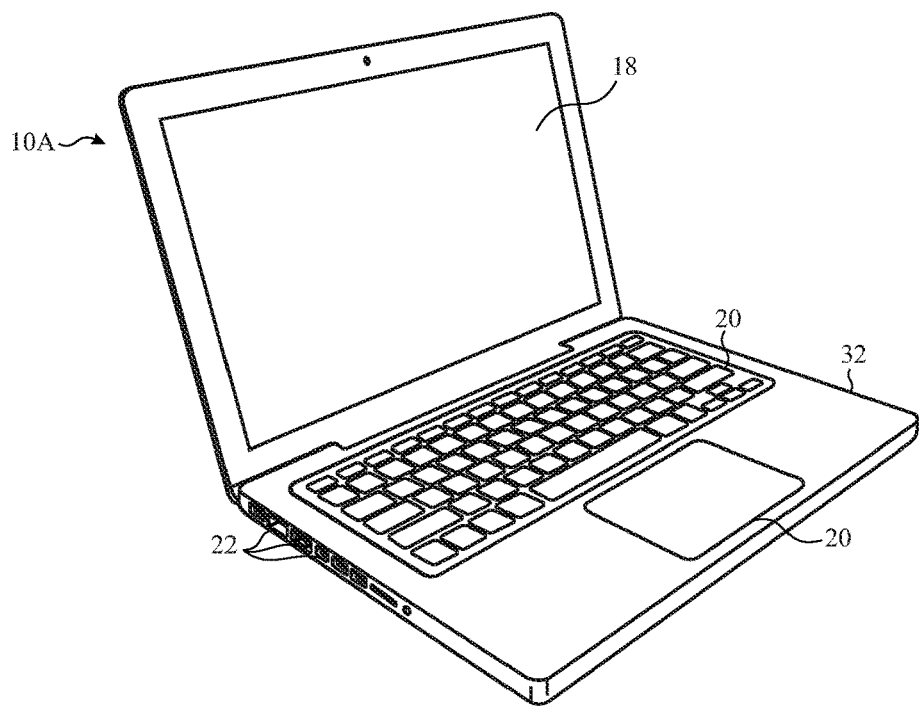
FIG. 2 is a perspective view of a notebook computer representing an embodiment of the electronic device of FIG. 1, in accordance with an embodiment.
Figure 3:
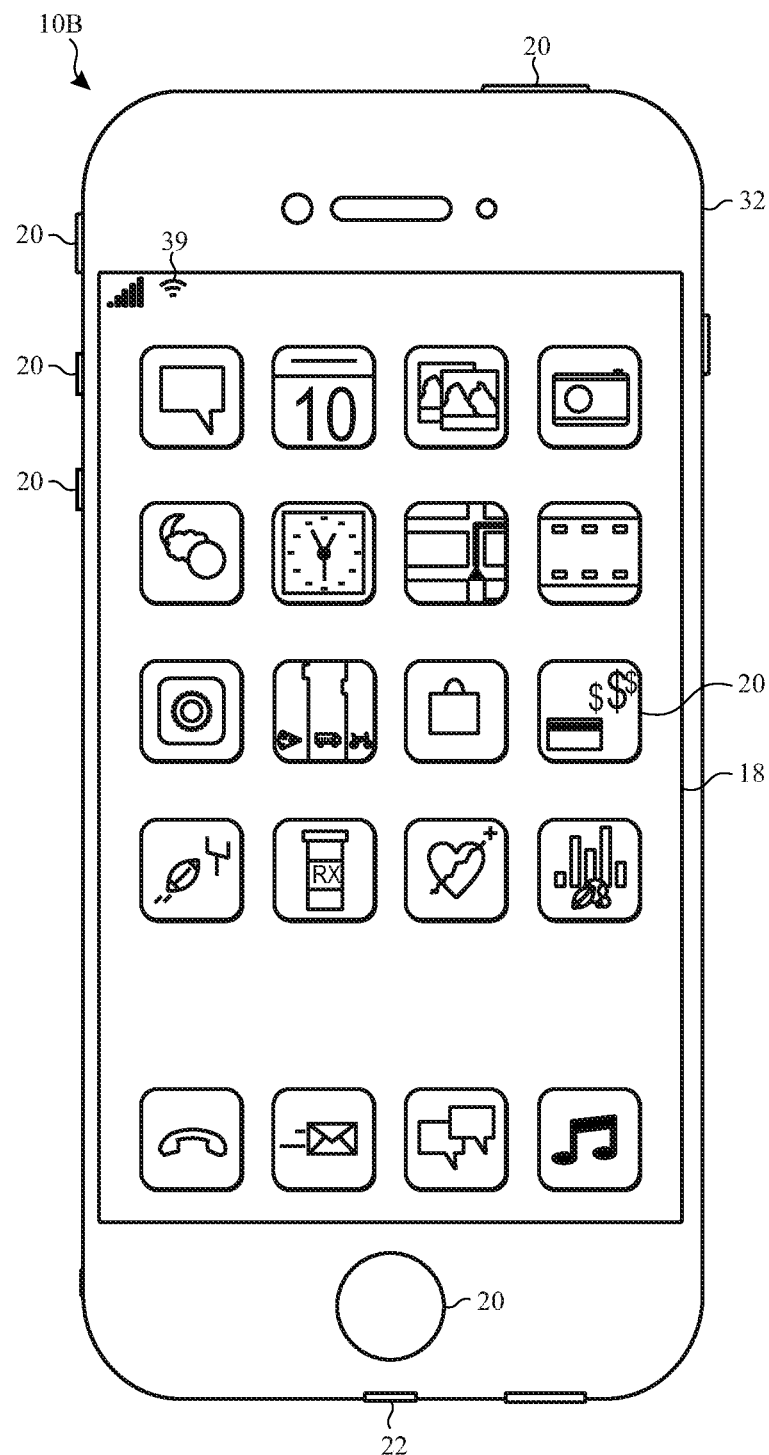
FIG. 3 is a front view of a hand-held device representing another embodiment of the electronic device of FIG. 1, in accordance with an embodiment.
Figure 4:
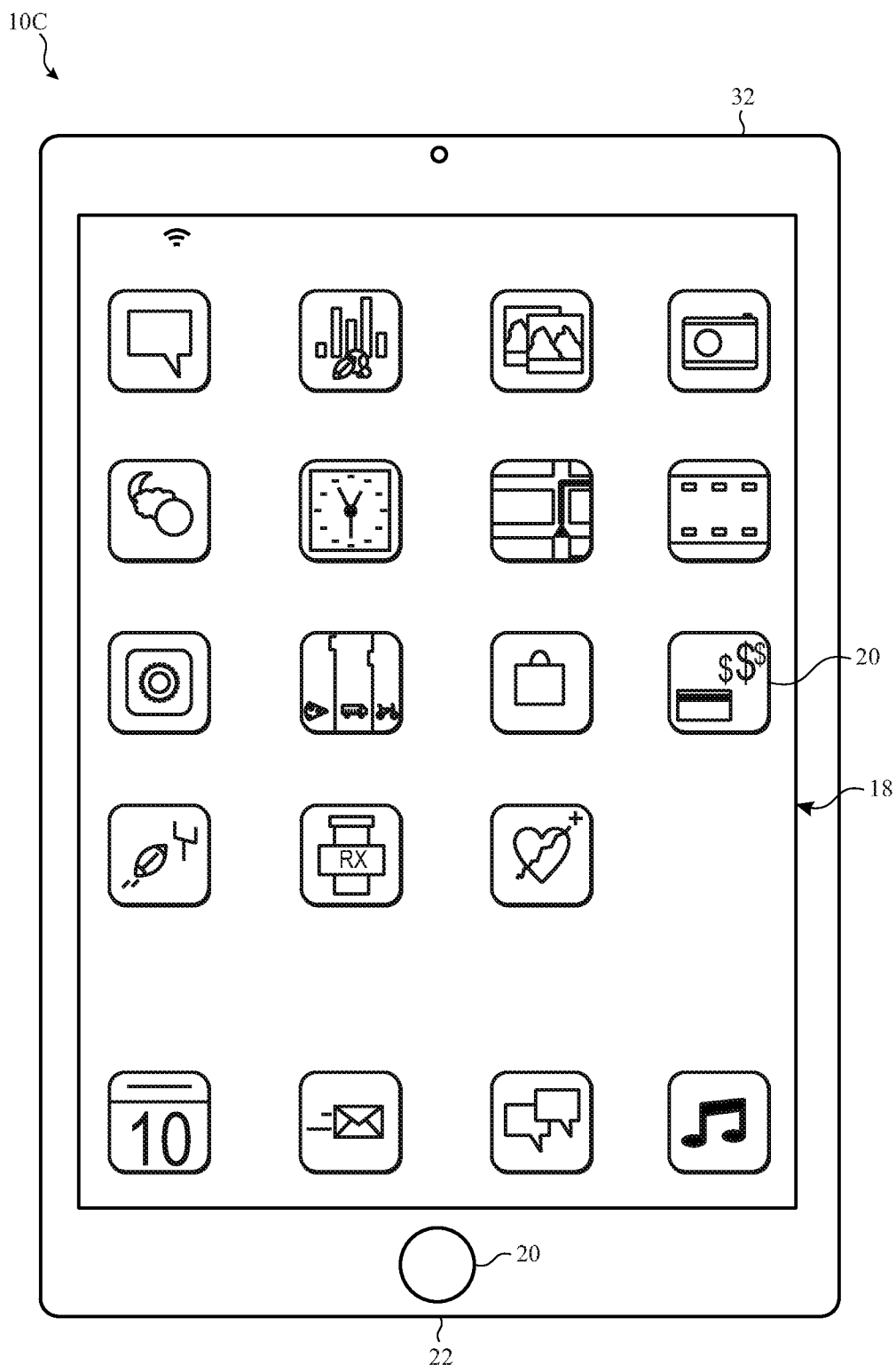
FIG. 4 is a front view of another hand-held device representing another embodiment of the electronic device of FIG. 1, in accordance with an embodiment.
Figure 5:
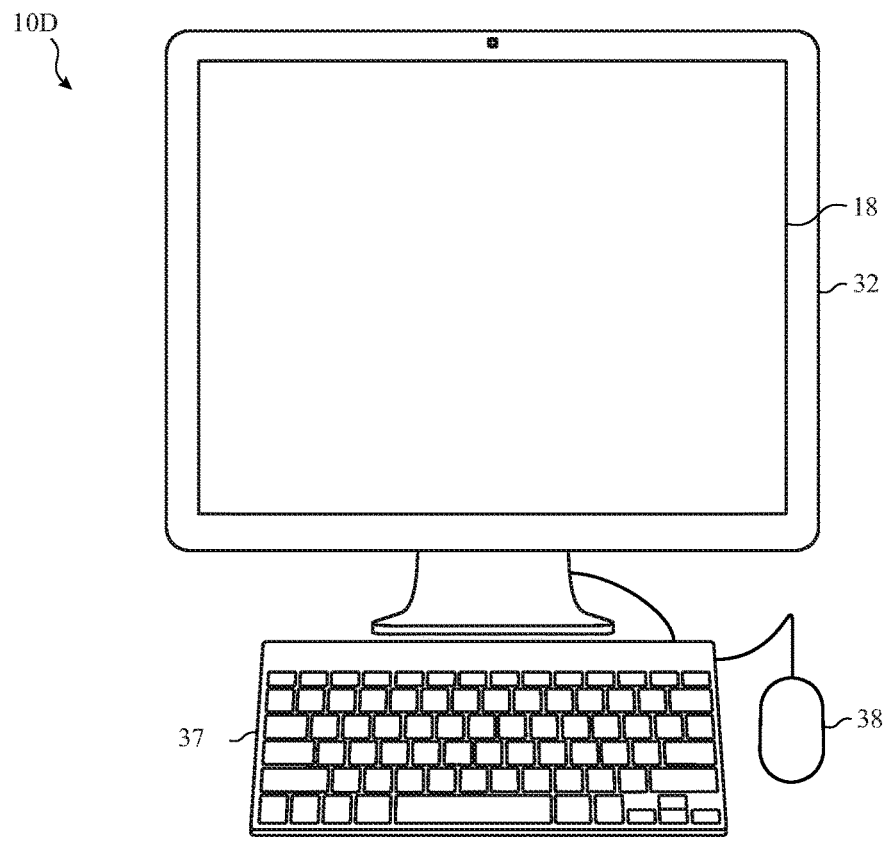
FIG. 5 is a front view of a desktop computer representing another embodiment of the electronic device of FIG. 1, in accordance with an embodiment.
Figure 6:
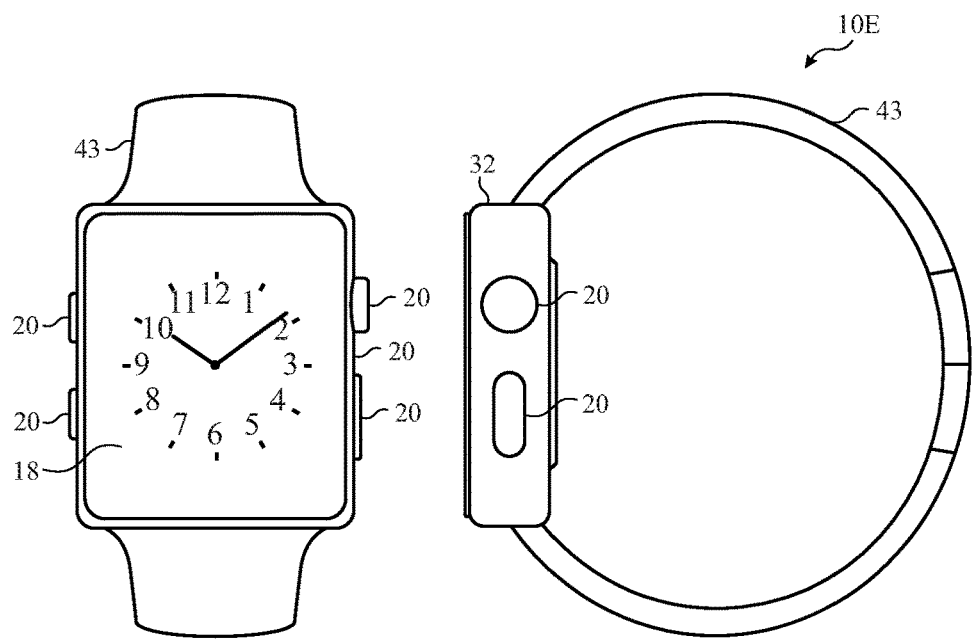
FIG. 6 is a front and side view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor core complex 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MACBOOK®, MACBOOK® Pro, MACBOOK AIR®, IMAC®, MAC® mini, or MAC PRO® available from APPLE INC. By way of example, the electronic device 10, taking the form of a notebook computer 10A, is illustrated in FIG. 2 in accordance with one embodiment of the present disclosure. The depicted computer 10A may include a housing or enclosure 32, a display 18, input structures 20, and ports of the I/O interface 22. In one embodiment, the input structures 20 (e.g., such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an IPOD® or IPHONE® available from APPLE INC. of Cupertino, Calif.

The handheld device 10B may include an enclosure 32 to protect interior components from physical damage and to shield them from electromagnetic interference. The enclosure 32 may surround the display 18, which may display indicator icons. The indicator icons may indicate, among other things, a cellular signal strength, BLUETOOTH connection, and/or battery life. The I/O interfaces 22 may open through the enclosure 32 and may include, for example, an I/O port for a hard-wired connection for charging and/or content manipulation using a connector and protocol, such as the Lightning connector provided by APPLE INC., a universal serial bus (e.g., USB), one or more conducted RF connectors, or other connectors and protocols.

The illustrated embodiments of the input structures 20, in combination with the display 18, may allow a user to control the handheld device 10B. For example, a first input structure 20 may activate or deactivate the handheld device 10B, one of the input structures 20 may navigate user interface to a home screen, a user-configurable application screen, and/or activate a voice-recognition feature of the handheld device 10B, while other of the input structures 20 may provide volume control, or may toggle between vibrate and ring modes. Additional input structures 20 may also include a microphone that may obtain a user's voice for various voice-related features, and a speaker to allow for audio playback and/or certain phone capabilities. The input structures 20 may also include a headphone input (not illustrated) to provide a connection to external speakers and/or headphones and/or other output structures.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an IPAD® available from APPLE INC. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an IMAC®, a MACBOOK®, or other similar device by APPLE INC. It should be noted that the computer 10D may also represent a personal computer (e.g., PC) by another manufacturer. A similar enclosure 32 may be provided to protect and enclose internal components of the computer 10D such as the display 18. In certain embodiments, a user of the computer 10D may interact with the computer 10D using various peripheral input devices, such as the keyboard 37 or mouse 38, which may connect to the computer 10D via an I/O interface 22.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an APPLE WATCH® by APPLE INC. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen (e.g., LCD, an organic light emitting diode display, an active-matrix organic light emitting diode (e.g., AMOLED) display, and so forth), which may allow users to interact with a user interface of the wearable electronic device 10E.

Figure 7:
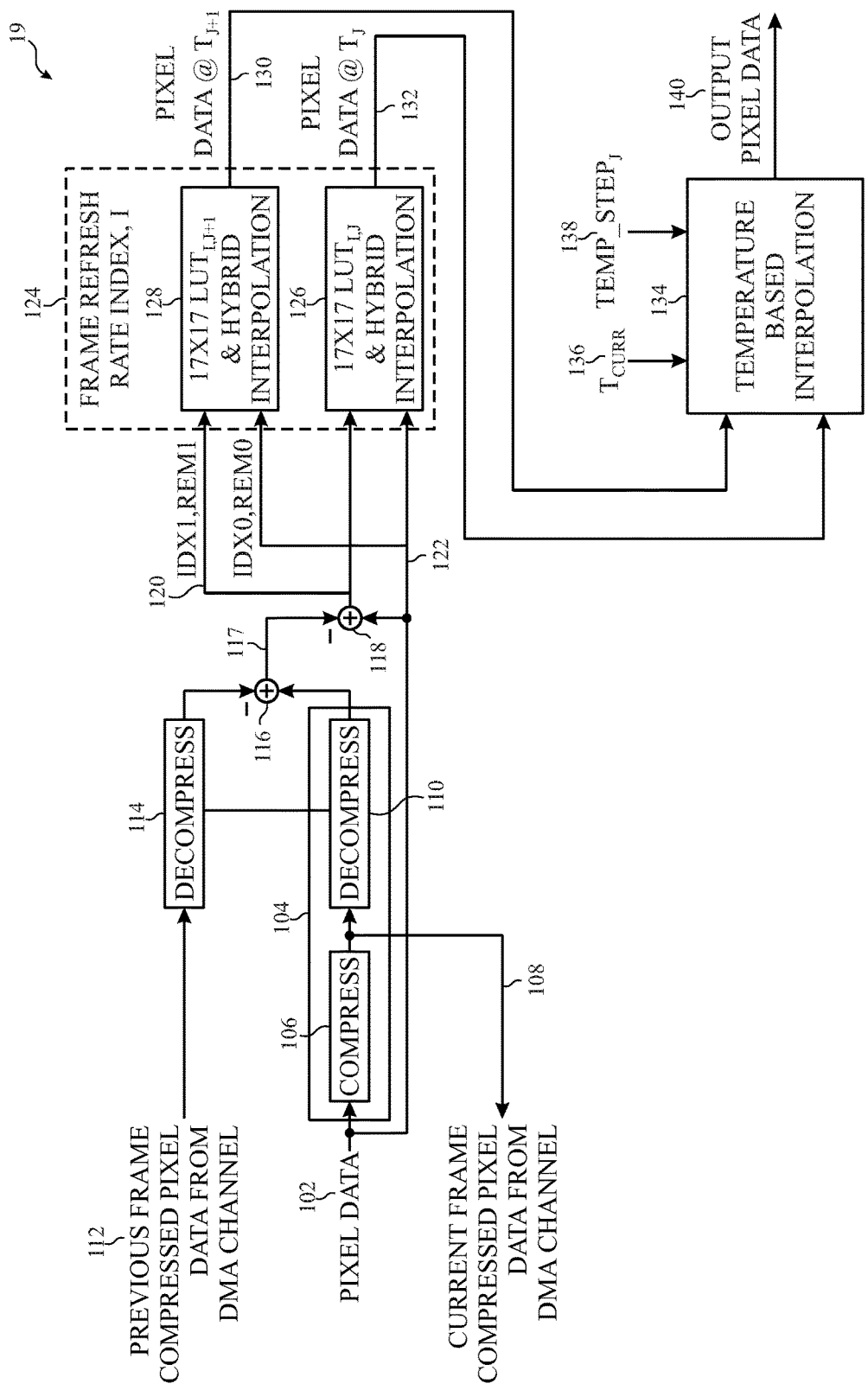
FIG. 7 illustrates a block diagram view of interpolation circuitry, in accordance with an embodiment.

As previously noted, shadow and tail artifacts may be caused due to motion blur interaction with other pixel compensation. FIG. 7 illustrates interpolation circuitry 19 that may be used to reduce these artifacts by overdriving pixel values for a current frame based at least in part on pixel values of a previous frame. The interpolation circuitry 19 receives pixel data 102. For example, the pixel data 102 corresponds to a current frame of pixel data to be displayed. The pixel data 102 is then submitted to compression circuitry 104 that compresses the data 102 in a compression portion 106 that is then used to output the current frame data in a compressed format 108. The compression circuitry 104 may also include a decompression portion 110 that may be used to decompress the compressed format 108 for use in the pixel circuitry. The compression circuitry 104 may be used to compress data (for use in subsequent frames of data) to minimize additional memory bandwidth and overall impact storage of previous data for use by the interpolation circuitry 19. In some embodiments, the data may be utilized without compression and/or decompression. In cases where data is compressed before storage (e.g., data in the compressed format 108), the compressed data is compressed and/or decompressed in the decompression circuitry 110 prior to processing the data. Furthermore, when data is compressed for a frame to be used in a subsequent frame, it may be recalled (from memory) as data 112. When data 112 is compressed, decompression circuitry 114 may be used to convert the data 112 into an uncompressed format for processing.

Uncompressed data from the decompression portion 110 and the decompression circuitry 114 may be used to analyze changes between the respective frames. To perform the analysis, data from the decompression portion 110 and the decompression circuitry 114 may be combined using summing circuitry 116. As illustrated, the summing circuitry 116 subtracts the previous frame data (from decompression circuitry 110) from the current frame data (from decompression portion 110) to determine a difference 117 between the data 102 of current frame and the data 112 of a previous frame. To verify a value for the previous data 112, the current data 102 may be combined with the difference 117 in summing circuitry 118. In other words, when the summing circuitry 118 is used to combine the data 102 and the difference 117, the resulting index 120 should correspond to the previous frame data value. The pixel data 102 may be used as the index 122. The indices 120 and 122 are submitted to frame refresh rate lookup tables 124, the frame refresh rate lookup tables 124 include one or more lookup tables, such as lookup tables 126 and 128.

The frame refresh rate lookup tables 124 output pixel data, such as data 130 and 132, that may be used by temperature-based interpolation circuitry 134. The frame refresh rate lookup tables 124, as discussed below, may output data based on a refresh rate, current image data, and/or previous image data. The temperature-based interpolation circuitry 134 may utilize other features such as the current temperature 136 and a temperature step 138. The temperature step 138 may indicate a difference in temperature between panel temperatures corresponding to the data 130 and the data 132. Otherwise the temperature step 138 may be used to vary a temperature difference between interpolation outputs of the frame refresh rate lookup tables 124. Using all the input values to the temperature-based interpolation circuitry 134, the temperature-based interpolation circuitry 134 outputs pixel data 140 that includes overdrive information based on refresh rate and/or temperature.

Values of overdrive lookup tables may be a function panel temperature and panel refresh rate as noted. An overall overdrive lookup table (e.g., include sub-lookup tables such as lookup tables 126 and 128 and temperature-based interpolation circuitry 134) may be indexed using frame refresh rate and panel temperature index. For a given frame refresh rate, the frame refresh rate lookup tables 124 are characterized at each of a number of temperature points.

Figure 8:
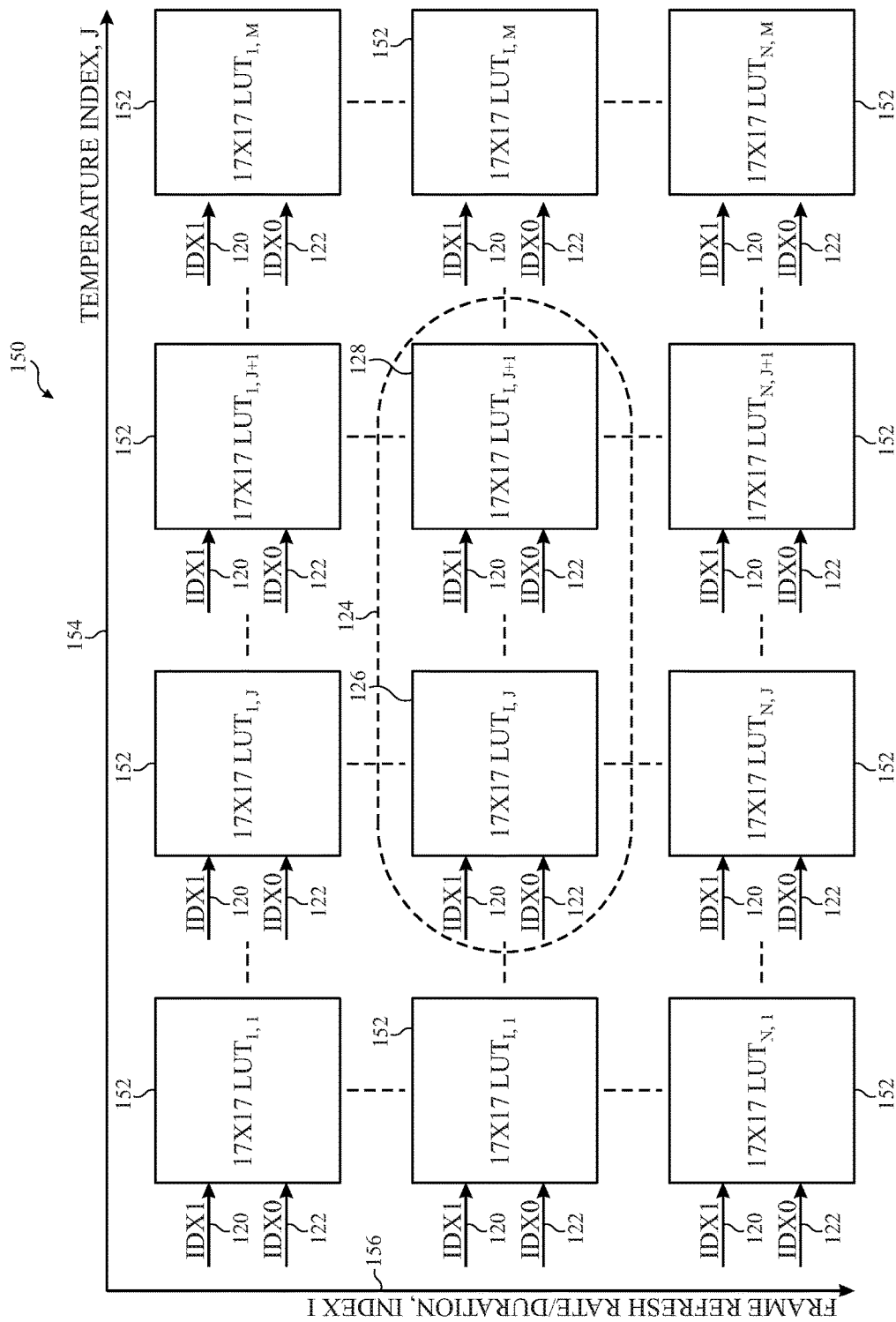
FIG. 8 illustrates an array of lookup tables that may be used with the interpolation circuitry of FIG. 7, in accordance with an embodiment.

For example, FIG. 8 illustrates an array of overdrive tables 152 based on a temperature index 154 and/or a frame refresh rate index 156. The indices may indicate various values. For example, the temperature index 154 may correspond to various temperatures between a minimum and maximum operating temperature each assigned a corresponding index value. The refresh rate index 156 may similarly index various possible refresh rates (e.g., 30 Hz, 45 Hz, 60 Hz, 120 Hz, 240 Hz, etc.). The overdrive tables 152 may be populated in a first row for a value (e.g., 1) of a refresh rate index 156 of one (e.g., corresponding to a lowest operating refresh rate). The output overdriving values are then computed for one or more of the overdrive tables 152 to determine one or more (e.g., two) possible temperature points. This data is input as the data 130 and 132 to be interpolated between by the temperature-based interpolation circuitry 134 to fully determine overdrive values based at least in part on current data, past data, a temperature, and/or a refresh rate of the display.

Figures 9, 10:
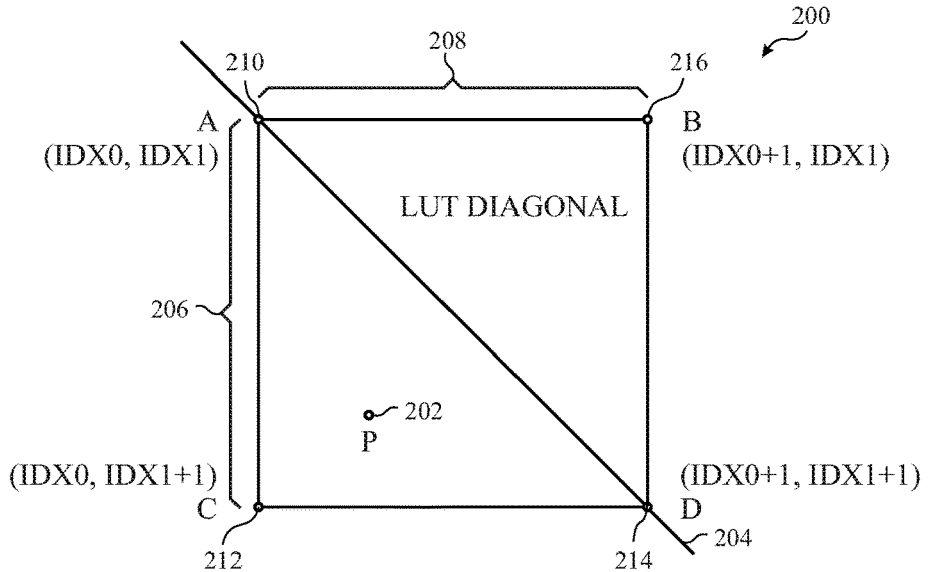
FIG. 9 illustrates a hybrid lookup table including positive and negative values, in accordance with an embodiment.
FIG. 10 illustrates a block diagram of an interpolation region of the lookup table of FIG. 9, in accordance with an embodiment.

Because unlimited lookup tables are practical/impossible, some interpolation may be used to determine the intermediate values of overdriving in the frame refresh rate lookup tables 124 and/or the temperature-based interpolation circuitry 134. For example, bilinear interpolation (e.g., Cartesian interpolation) may be applied to determine values between indexed points based on a refresh rate. To increase efficiency of storage of the interpolation values, positive and negative overdrive values may be stored in a single lookup table. While bilinear interpolation is an effective method for two-dimensional lookup table interpretation, bilinear interpolation may cause leakage of a positive overdrive setting to a negative overdrive value when positive and negative overdrive values are included in a single lookup table. For example, FIG. 9 illustrates a lookup table 170 that includes positive and negative interpolation values. As previously noted, the positive overdrive values 172 and negative overdrive values 174 may be combined into a single lookup table to reduce memory consumption for overdrive computation. However interpolation between the positive overdrive values 172 and the negative overdrive values 174 may be incorrectly attributed near a diagonal 175 of the lookup table 170. As illustrated, the positive overdrive values 172 may occur when a starting grey level 176 is lower than an arrival grey level 178. Similarly, the negative overdrive values 174 occur when a starting grey level 176 value is greater than a corresponding arrival grey level 178 value. Although the illustrated lookup table 170 is a 9×9 lookup table, the concepts discussed herein may be applied to any size of lookup table overdrive values that includes both positive and negative overdrive values. When using bilinear interpolation, interpolations of interpolation regions 180 that overlap the diagonal may improperly overdrive by applying a positive overdrive when a negative overdrive (or vice versa) is appropriate.

To account for this potential leakage, barycentric interpolation may be applied. Barycentric interpolation utilizes a barycentric coordinate system. The barycentric coordinate system is a coordinate system where a location of a point is defined relative to vertices of a simplex (e.g., triangle, tetrahedron, etc.). FIG. 10 illustrates an interpolation region 200 similar to the interpolation regions 180 of FIG. 9. The interpolation region 200 includes a point 202 to be interpolated within the region. As illustrated, the interpolation region 200 includes a diagonal 204 of a lookup table (e.g., lookup table 170) that separates negative overdrive values 206 from positive overdrive values 208. Since barycentric interpolation utilizes triangle vertices and the point 202 is in the negative overdrive values 206, barycentric interpolation may be used to interpolate the point 202 using known values at vertices 210, 212, and 214. If the point 202 were located in the positive overdrive values 208, barycentric interpolation may be used to interpolate values using known values at vertices 210, 214, and 216.

Figure 11:
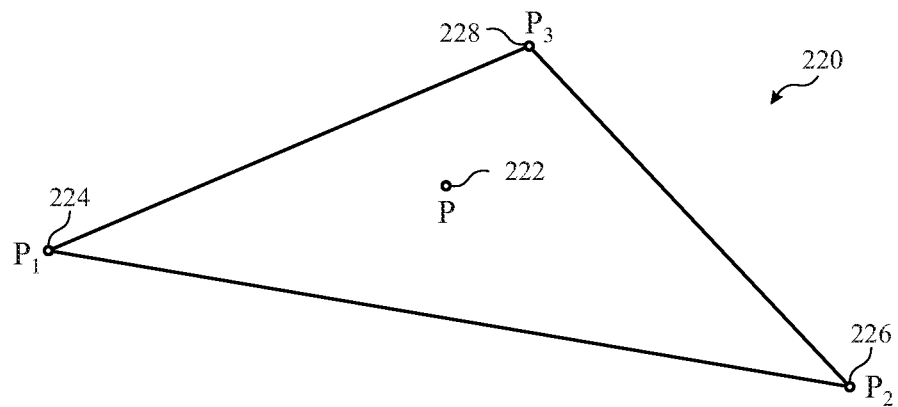
FIG. 11 illustrates a block diagram of a portion of the interpolation region having a common sign, in accordance with an embodiment.
Figure 12:
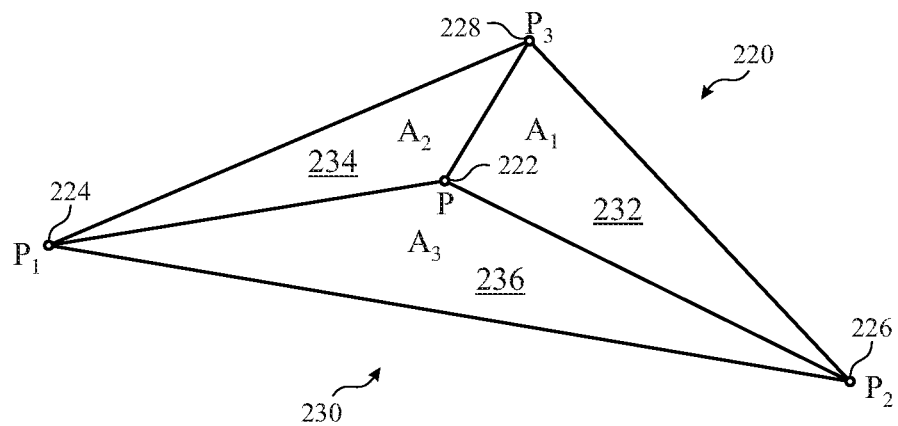
FIG. 12 illustrates a block diagram of the portion of FIG. 12 showing representative areas in relation to vertices of the portion, in accordance with an embodiment.

FIG. 11 illustrates a triangle 220 that may be used to imply barycentric interpolation to overdrive values. The triangle 220 encompasses a point 222 between vertices 224, 226, and 228. In barycentric interpolation, the relative contribution of each the vertices 224, 226, and 228 are proportion to an area of a triangle formed opposite the respective vertex to an area of the triangle 220. FIG. 12 illustrates a subdivision 230 of the triangle 220 into component triangles. As illustrated, the triangle 220 may be subdivided into triangles 232, 234, and 236 by connecting the point to all three vertices. A relative contribution of a vertex may be based at least in part on an area of a triangle including the other two vertices and the point 222. For instance, vertex 224 may be related to an area of triangle 232, vertex 226 may be related to an area of triangle 234, and vertex 228 may be related to an area of triangle 236. Furthermore, Table 1 illustrates a relative contribution to an interpolated value at point 222.

TABLE 1

Relative contribution to the interpolated value at point P

| Triangle Vertex | Relative contribution to the interpolated value at point P |
|---|---|
| $P_1$ | $\Delta(P, P_2, P_3)/\Delta(P_1, P_2, P_3)$ |
| $P_2$ | $\Delta(P, P_1, P_3)/\Delta(P_1, P_2, P_3)$ |
| $P_3$ | $\Delta(P, P_1, P_2)/\Delta(P_1, P_2, P_3)$ |

The area of the appropriate triangle may be calculated using a spatial location of the triangle vertices determined from the indices for the lookup table. For instance, when each vertex is $P_i$ is located at coordinate $(x_i, y_i)$ of the indices for the lookup table, Table 2 shows how to determine the relative contribution to an interpolated value at the point P.

TABLE 2

Vertex relative contribution

| Triangle Vertex | Computation of the vertex relative contribution to the interpolated value at point P |
|---|---|
| $P_1$ | $\mathrm{abs}\left(\det\left(\begin{bmatrix} x & x_2 & x_3 \\ y & y_2 & y_3 \\ 1 & 1 & 1 \end{bmatrix}\right)\right) / \mathrm{abs}\left(\det\left(\begin{bmatrix} x_1 & x_2 & x_3 \\ y_1 & y_2 & y_3 \\ 1 & 1 & 1 \end{bmatrix}\right)\right)$ |
| $P_2$ | $\mathrm{abs}\left(\det\left(\begin{bmatrix} x_1 & x & x_3 \\ y_1 & y & y_3 \\ 1 & 1 & 1 \end{bmatrix}\right)\right) / \mathrm{abs}\left(\det\left(\begin{bmatrix} x_1 & x_2 & x_3 \\ y_1 & y_2 & y_3 \\ 1 & 1 & 1 \end{bmatrix}\right)\right)$ |
| $P_3$ | $\mathrm{abs}\left(\det\left(\begin{bmatrix} x_1 & x_2 & x \\ y_1 & y_2 & y \\ 1 & 1 & 1 \end{bmatrix}\right)\right) / \mathrm{abs}\left(\det\left(\begin{bmatrix} x_1 & x_2 & x_3 \\ y_1 & y_2 & y_3 \\ 1 & 1 & 1 \end{bmatrix}\right)\right)$ |

Since barycentric interpolation enables more accurate interpolation near diagonal with a lookup table having positive and negative overdrive values, it may be used near the diagonal. However, as previously noted, barycentric interpolation may have decreased accuracy away from the diagonal. Furthermore, in some embodiments, barycentric interpolation may utilize more complex calculations than bilinear interpolation. Thus, a lookup table interpolation model may utilize hybrid interpolation with barycentric interpolation near a diagonal/boundary between positive and negative interpolation values and bilinear interpolation away from the diagonal/boundary.

Figure 13:
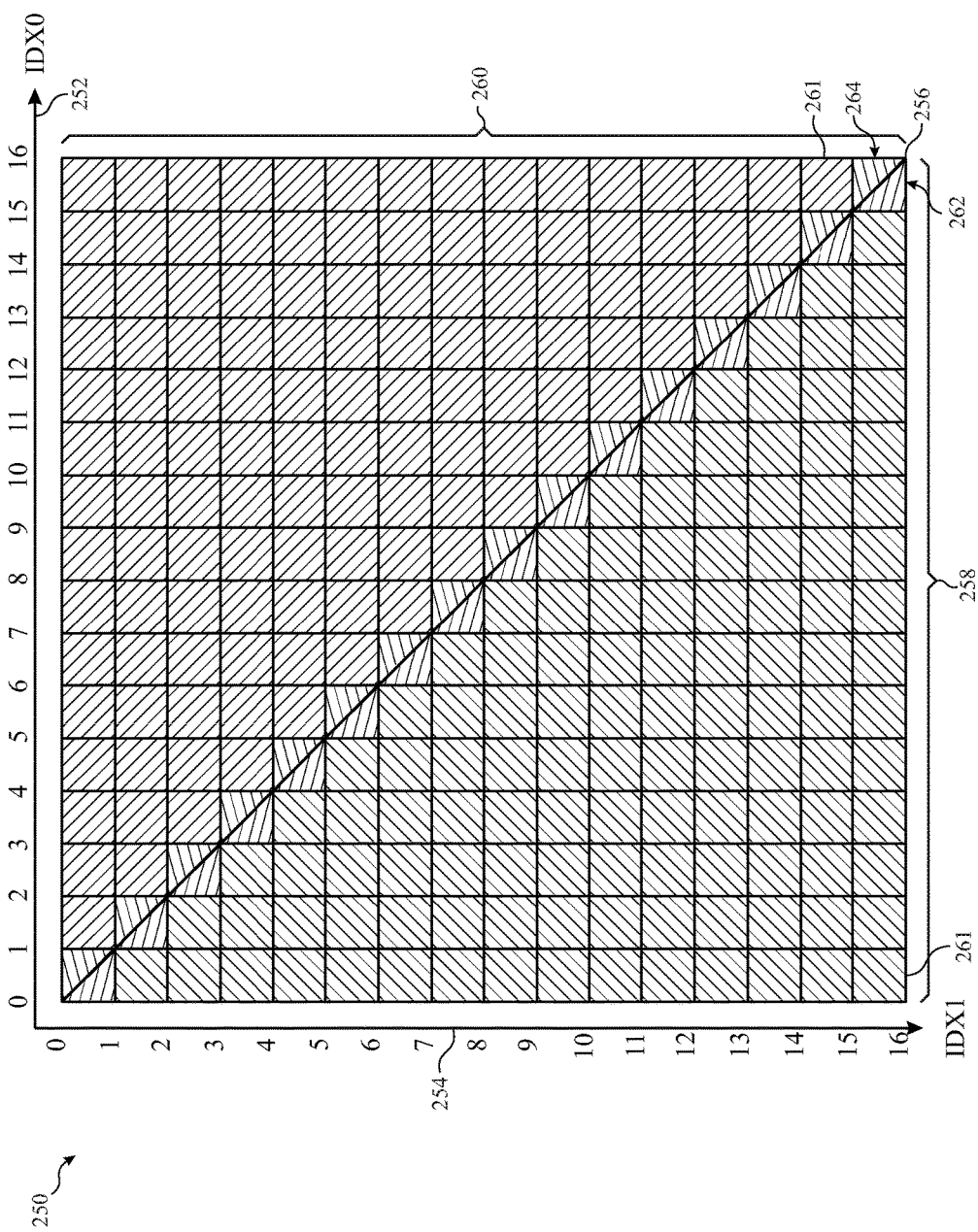
FIG. 13 illustrates a hybrid lookup table with two types of interpolations, in accordance with an embodiment.
Figure 14:
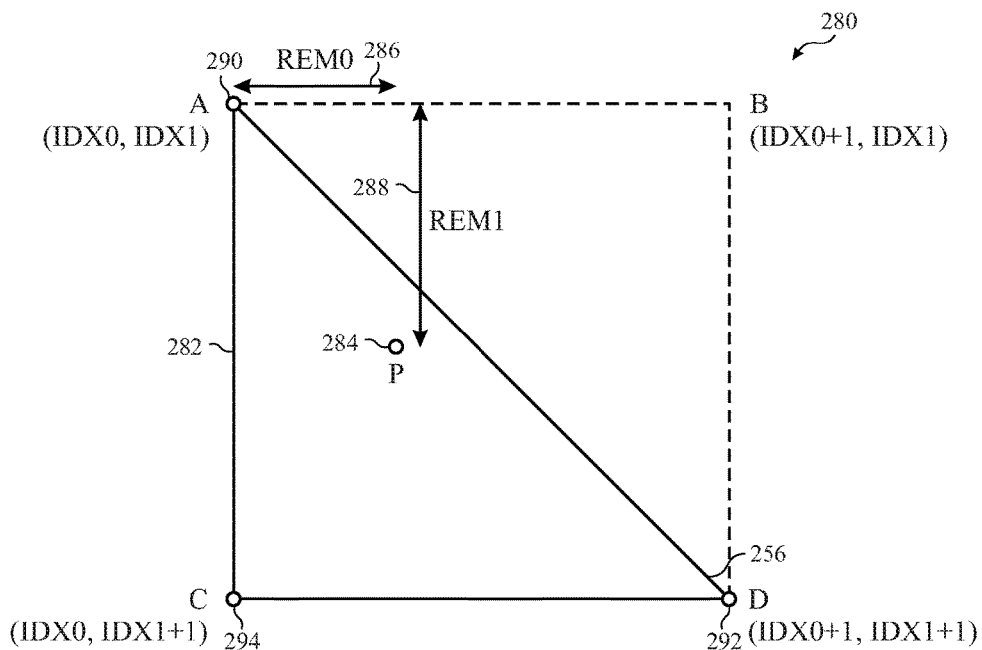
FIG. 14 illustrates a portion of the lookup table of FIG. 13 with a negative overdrive value, in accordance with an embodiment.
Figure 15:
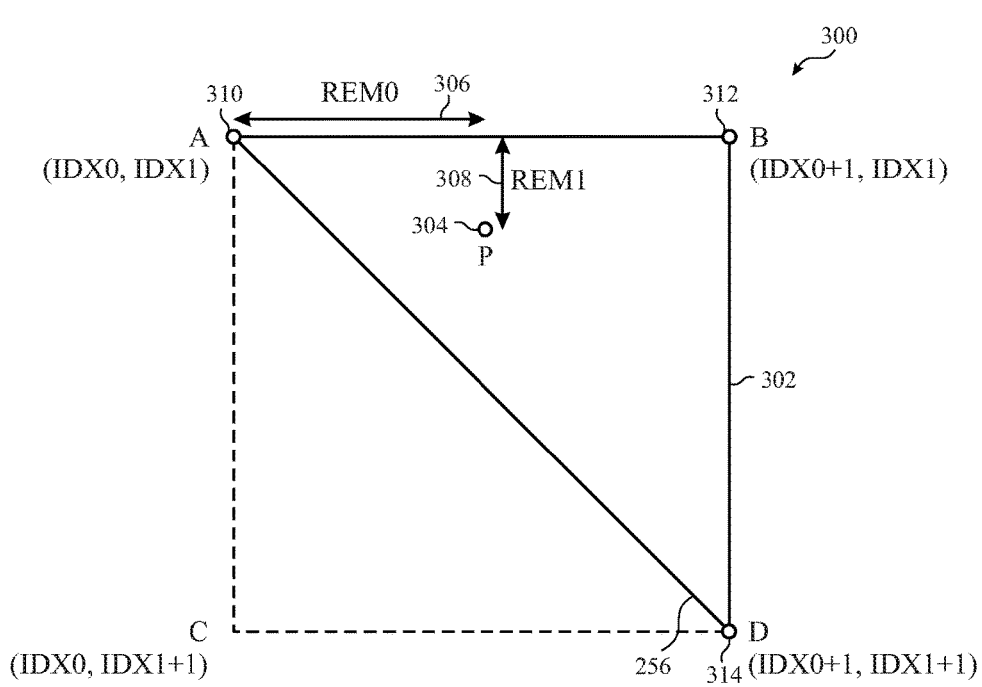
FIG. 15 illustrates a portion of the lookup table of FIG. 13 with a positive overdrive value, in accordance with an embodiment.

FIG. 13 illustrates a hybrid interpolation lookup table 250. As illustrated, the hybrid interpolation lookup table 250 is indexed using a first index 252 and a second index 254. In some embodiments, the first index 252 may correspond to a target/arriving grey level for current frame data while the second index 254 may correspond to a starting grey level for previous frame data. The hybrid interpolation lookup table 250 also includes a boundary 256 (e.g., diagonal) separating negative overdrive values 258 and positive overdrive values 260. As previously noted, positive overdrive values 260 may result when arrival grey levels are higher than a starting grey level, and negative overdrive values 258 may result when arrival grey levels are lower than a starting grey level. In other words, when the grey level reduces between frames the overdrive compensation is negative, but when the grey level increases between frames the overdrive compensation is positive. Interpolation regions 261 away from the boundary 256 are to be interpolated using a first interpolation type (e.g., bilinear interpolation). However, to ensure that interpolation is done properly about the boundary 256, a second interpolation type (e.g., barycentric interpolation) may be performed in interpolation regions 262 and 264. Interpolation regions 262 are interpolated for negative overdrive values near the boundary 256; and interpolation regions 264 are interpolated for positive overdrive values near the boundary 256. Within an interpolation region 262, a point may be interpolated by determining contributions from known values (e.g., wherein the indices 252 and 254 increment). Interpolation is performed for the remainders between these indexed values. For example, FIG. 14 illustrates a triangular-shaped interpolation region 280 for negative overdrive values 282 below the boundary 256. A point 284 to be interpolated extends horizontally by a remainder 286 and vertically by a remainder 288 beyond a known vertex 290. Since vertices 292 and 294 are also known, the point 284 may be calculated by determining a contribution from the corresponding vertices using the calculations shown in Table 2 above. This same process may be applied to positive or negative overdrive values. For example, FIG. 15 illustrates a triangular-shaped interpolation region 300 for positive overdrive values 302 above the boundary 256. A point 304 to be interpolated extends horizontally by a remainder 306 and vertically by a remainder 308 beyond a known vertex 310. Since vertices 312 and 314 are also known, the point 304 may be calculated by determining a contribution from the corresponding vertices using the calculations shown in Table 2 above. In other words, the hybrid interpolation lookup table 250 utilizes vertices of a triangle bounding appropriate values rather than using a square that includes both positive and negative overdrive values to run a risk of leakage of improper overdrive compensation between situations.

Figure 16:
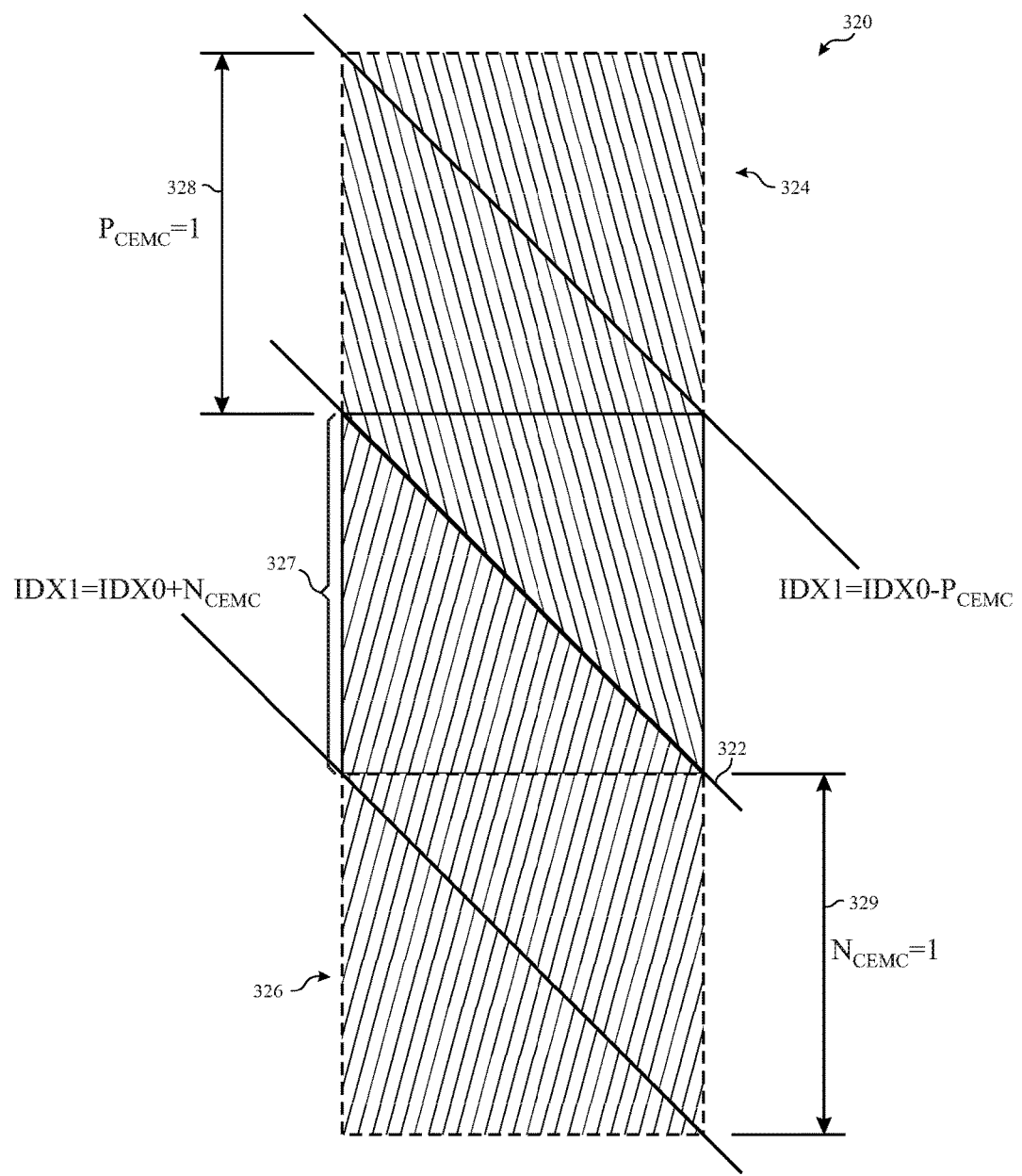
FIG. 16 illustrates a portion of a lookup table with one additional interpolation region above and below the diagonal boundary, in accordance with an embodiment.

How many regions around the boundary 256 to be interpolated using the second interpolation type may be programmable through a compression error mitigation channel (CEMC). Hybrid interpolation enables flexible construction of CEMCs. These flexible CEMCs may be used to further reduce the impact of compression errors on static pixels between frames. A positive CEMC size is set and controlled by setting a first variable (e.g., $P_{CEMC}$) to a value. In some embodiments, this value is limited to a set of integers (e.g., 0,1,2). Similarly, a negative CEMC may constructed and controlled by setting a variable (e.g., $N_{CEMC}$) to a value. In some embodiments, this value is limited to a set of integers (e.g., 0,1,2). FIG. 16 illustrates a portion 320 of a hybrid interpolation lookup table where a positive CEMC value and a negative CEMC value are both set to one. In the portion 320, a diagonal 322 sets a boundary between positive overdrive values 324 and negative overdrive values 326. In addition to the interpolation region 327 cut by the diagonal 322, other portions may utilize barycentric (or other triangular based interpolation) to interpolate values. For example, barycentric interpolation is applied to interpolation boundary regions 328 up to one ($P_{CEMC}=1$) region above those being traversed by the diagonal 322. Similarly, since the negative CEMC value is set to one, barycentric interpolation is applied to interpolation boundary regions 329 up to one ($N_{CEMC}=1$) region below those being traversed by the diagonal 322.

Figure 17:
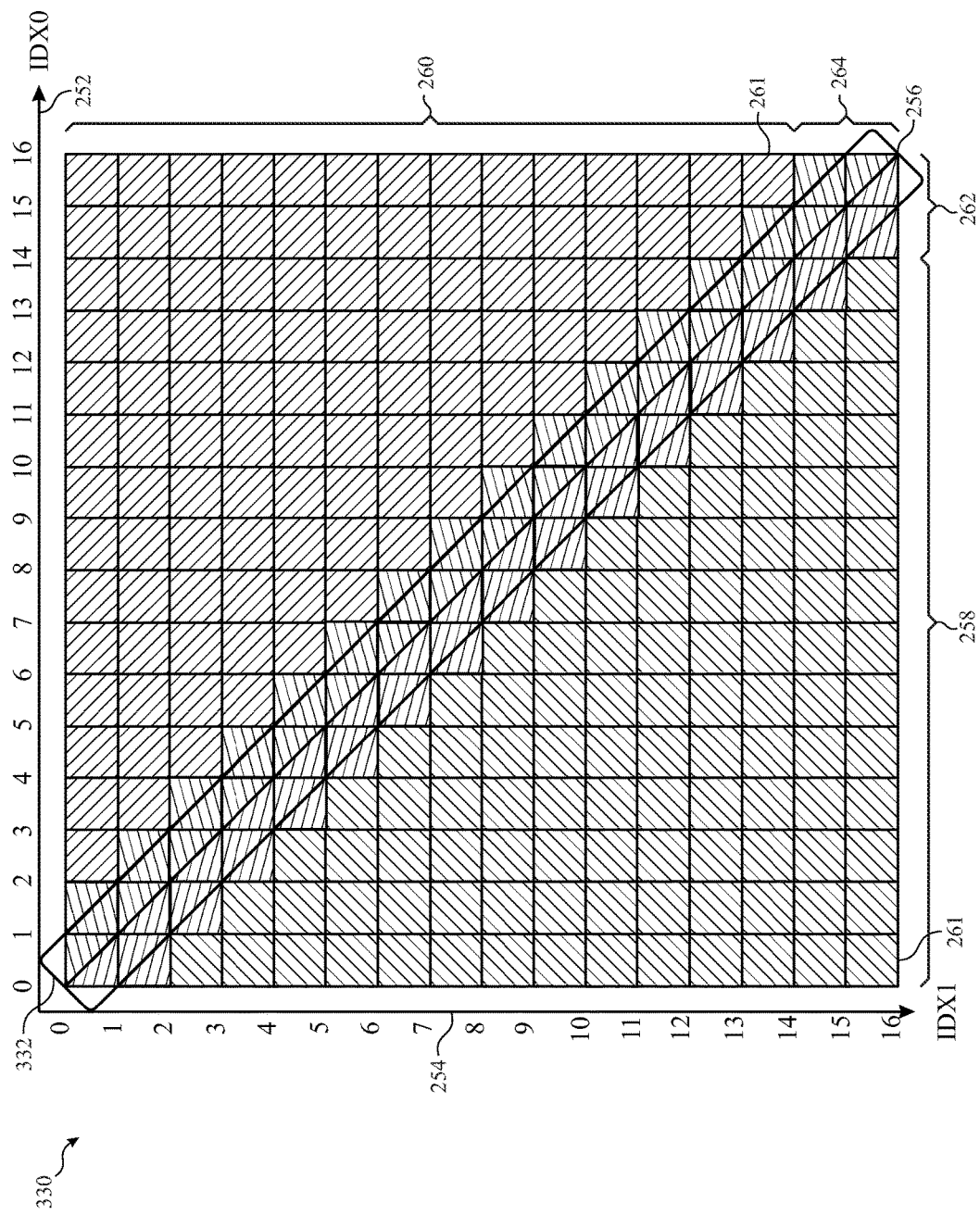
FIG. 17 illustrates the lookup table of FIG. 16, in accordance with an embodiment.

FIG. 17 illustrates a lookup table 330 that corresponds to the lookup table 250 with positive and negative CEMC values set to one. In other words, the lookup table 250 may correspond to positive and negative CEMC values set to zero. As illustrated, the lookup table 330 includes a barycentric interpolation zone 332 where barycentric interpolation is applied to one interpolation region 261 above and one interpolation region 261 below the boundary 256.

Figure 18:
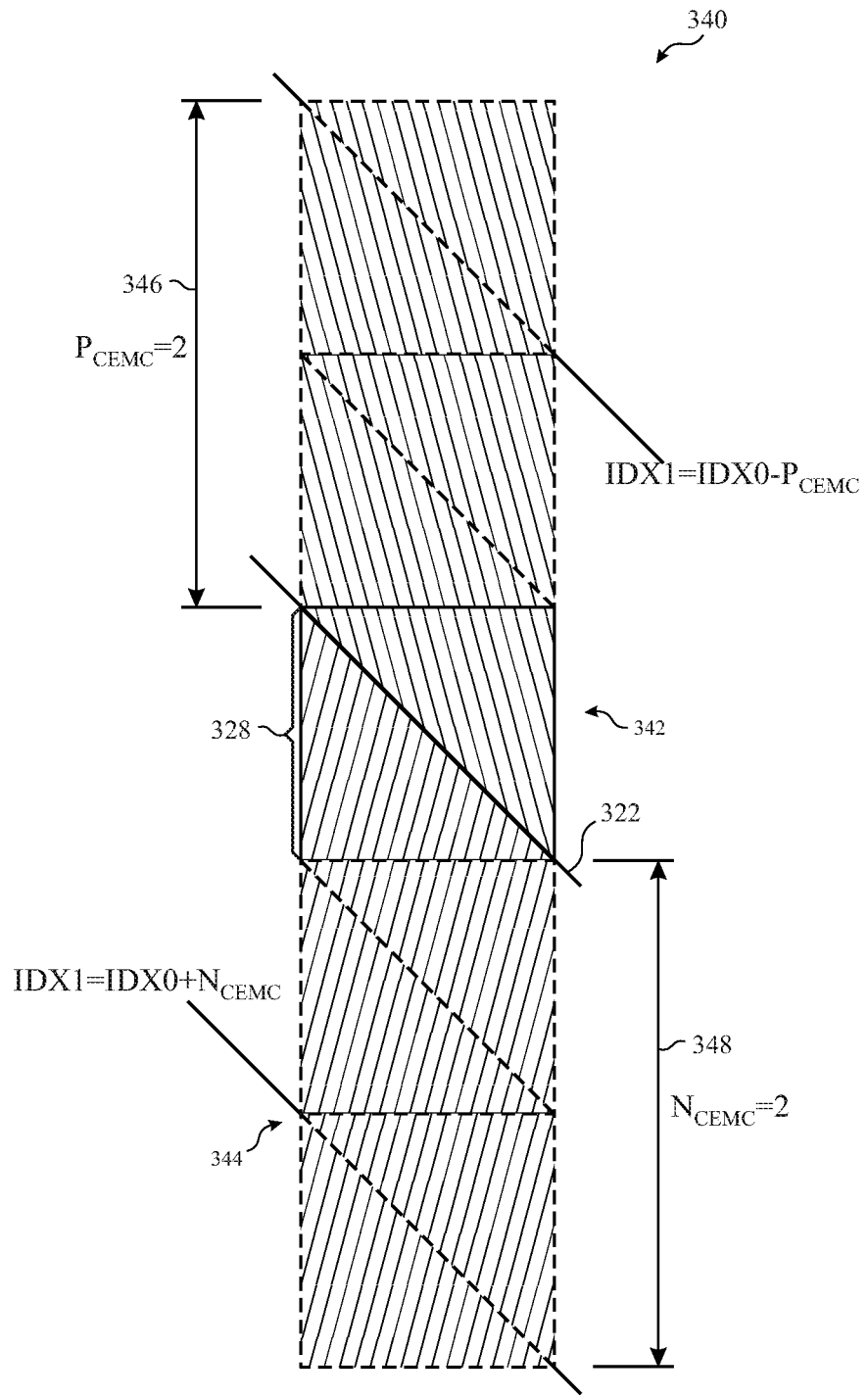
FIG. 18 illustrates a portion of a lookup table with two additional interpolation regions above and below the diagonal boundary, in accordance with an embodiment.

FIG. 18 illustrates a portion 340 of a hybrid interpolation lookup table where a positive CEMC value and a negative CEMC value are both set to two. In the portion 340, the diagonal 322 sets a boundary between positive overdrive values 342 and negative overdrive values 344. In addition to the interpolation region 328 cut by the diagonal 322, the portion 340 utilizes barycentric (or other triangular based interpolation) to interpolate values. For example, barycentric interpolation is applied to interpolation boundary regions 346 up to two ($P_{CEMC}=2$) regions above those being traversed by the diagonal 322. Similarly, since the negative CEMC value is set to two, barycentric interpolation is applied to interpolation boundary regions 348 up to two ($N_{CEMC}=2$) regions below those being traversed by the diagonal 322.

Figure 19:
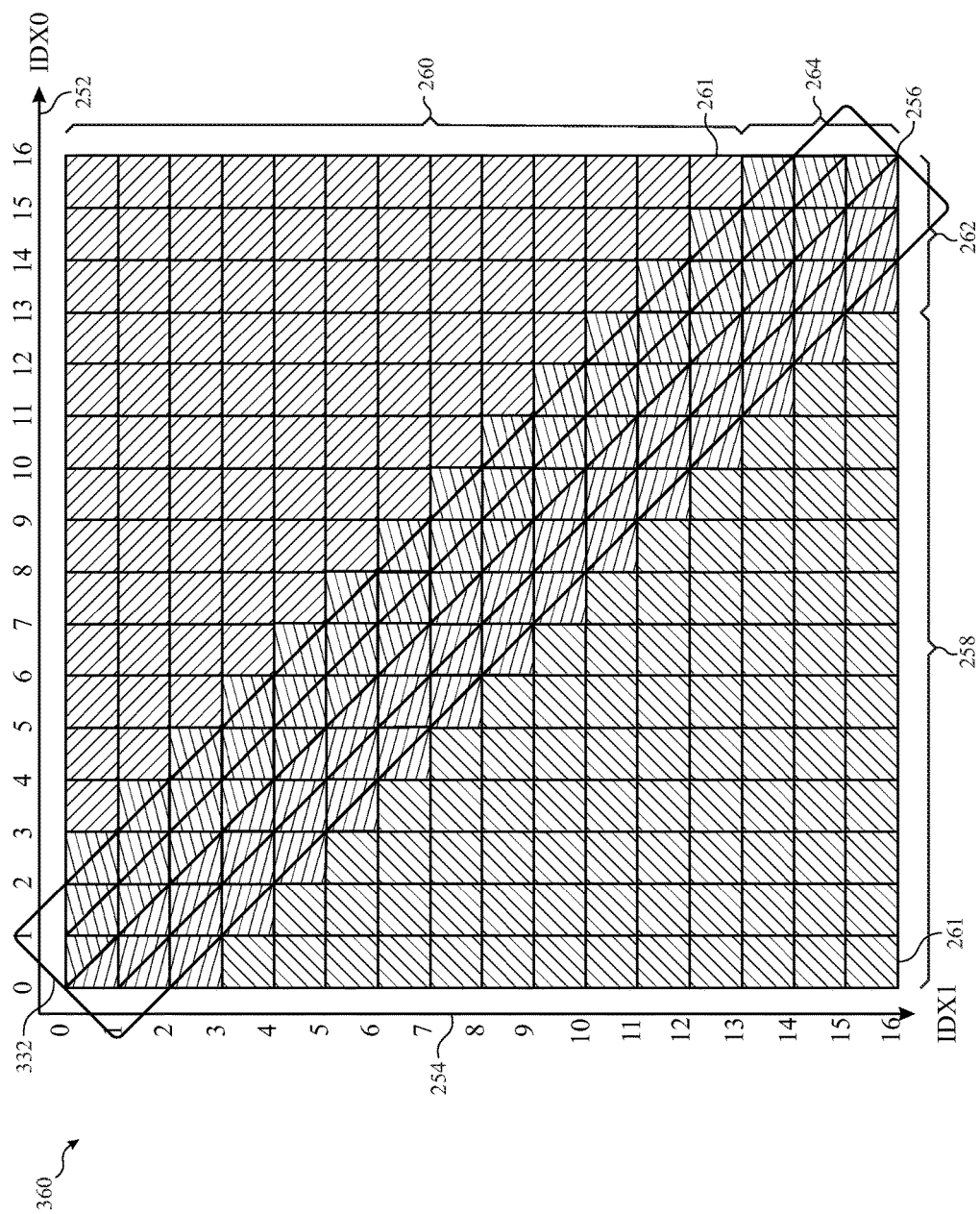
FIG. 19 illustrates the lookup table of FIG. 18, in accordance with an embodiment.

FIG. 19 illustrates a lookup table 360 that corresponds to the lookup tables 250 and 330, but the lookup table 360 has positive and negative CEMC values set to two. As illustrated, the lookup table 360 includes the barycentric interpolation zone 332 where barycentric interpolation is applied to two interpolation regions 261 above and two interpolation regions 261 below the boundary 256. Although each of the foregoing examples includes $N_{CEMC}=P_{CEMC}$, other embodiments may include one value for $N_{CEMC}$ and another value for $P_{CEMC}$.

Figure 20:
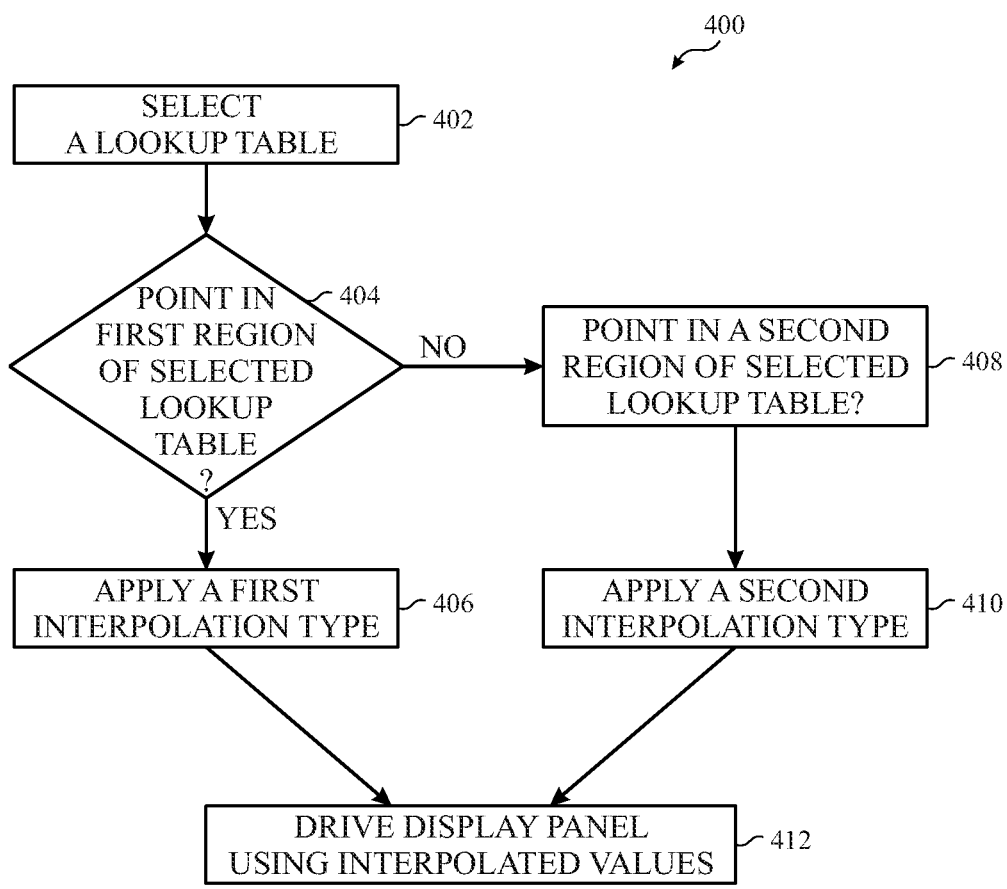
FIG. 20 illustrates a flow diagram view of a process for interpolating overdrive values, in accordance with an embodiment.

FIG. 20 illustrates a process 400 for determining overdrive values of a display. The process 400 may be used with one or more lookup tables. When the process 400 is used with more than one lookup table, the process 400 may include selecting at least one lookup table from the one or more lookup tables (block 402). In each selected lookup table, interpolation is applied to determine intermediate points. For example, interpolation may be used to determine an overdrive value based on changes in greyscale levels between a previous image frame and a current image frame. However, each table may include more than a single interpolation type. Accordingly, the interpolation circuitry, such as a processor, hard circuitry, or a combination thereof, determines whether a point to be interpolated falls in a first portion of the lookup table (block 404). For example, the first portion may include a barycentric interpolation zone at/near a diagonal or boundary between positive and negative overdrive values. The barycentric interpolation zone may include at least some positive and some negative overdrive values. If the point falls in this first portion, the interpolation circuitry applies a first interpolation type to the point (block 406).

If the point does not fall in the first portion, in some embodiments, the point may be deemed to fall in a second portion (block 408). In other embodiments, the interpolation circuitry may also directly determine whether the point falls in the second portion. If the point is determined to be in the first portion and not in the second portion, the point is treated as in the first portion. The same is true for the opposite finding. However, if a point is determined to be in or not be in both the first and second portions, an error may be returned as indicating failure.

The second portion may be a bilinear interpolation region where bilinear interpolation is to be applied away from the diagonal or boundary. If the point falls in this second portion, the interpolation circuitry applies a second interpolation type to the point (block 410). The process ends with pixels being driven for a display panel using the interpolated overdrive values (block 412). For example, this driving may be performed by driving circuitry of the display 18.

Although the foregoing discussion discusses circuitry (e.g., interpolation circuitry 19), in some embodiments, at least a portion of the function described may be performed using a processor executing instructions stored in memory. As such, as used herein, the functions herein disclosed as completed by circuitry may be implemented in hard circuitry, software instructions, or any combination thereof.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. Furthermore, it should be further understood that each of the embodiments disclosed above may be used with any and all of the other embodiments disclosed herein. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method comprising:
   interpolating overdrive values using a lookup table to compensate for potential display artifacts by:
   applying a first interpolation type to a first portion of the lookup table when a point to be interpolated is in the first portion of the lookup table, wherein the first portion is above a diagonal of the lookup table;
   applying the first interpolation type to a second portion of the lookup table when the point to be interpolated is in the second portion of the lookup table, wherein the second portion is below the diagonal; and
   applying a second interpolation type to a third portion of the lookup table when the point to be interpolated is in the third portion of the lookup table, wherein the third portion includes the diagonal and extends above and below the diagonal; and
   driving pixels of a display panel using the interpolated overdrive values.

2. The method of claim 1, wherein interpolating the overdrive values comprises interpolating the overdrive values based at least in part on a grey level of a current frame.

3. The method of claim 1, wherein interpolating the overdrive values comprises interpolating the overdrive values based at least in part on a grey level of a previous frame.

4. The method of claim 1, wherein the first interpolation type comprises barycentric interpolation.

5. The method of claim 1, wherein the third portion includes interpolation regions above the diagonal and within a threshold value of the diagonal in an upward direction.

6. The method of claim 1, wherein the third portion includes interpolation regions below the diagonal and within a threshold value of the diagonal in a downward direction.

7. The method of claim 1, wherein the second interpolation type comprises bilinear interpolation.

8. The method of claim 7, wherein the first and second portions includes interpolation regions away from the diagonal separating positive overdrive values from negative overdrive values in the lookup table.

9. A system comprising:
   interpolation circuitry configured to:
   receive current frame image data; and
   receive previous frame image data;
   interpolate an overdrive value based at least in part on the current frame image data and the previous frame image data, wherein interpolating the overdrive value comprises interpolating, in a single lookup table, to obtain:
   positive overdrive values when a point to be interpolated is located in a first region of the single lookup table,
   negative overdrive values when the point to be interpolated is located in a second region of the single lookup table;
   mixed overdrive values when the point to be interpolated is located in a third region located about a diagonal of the single lookup table, wherein the mixed overdrive values are interpolated using barycentric interpolation; and
   driving circuitry configured to drive a display panel based at least in part on the overdrive value.

10. The system of claim 9 comprising compression circuitry comprising:
    a compression portion configured to receive the current frame image data and compress the current frame image data into compressed current frame image data for storage in memory; and
    a decompression portion configured to decompress the compressed current frame image data into decompressed current frame image data for further processing.

11. The system of claim 10, comprising decompression circuitry configured to retrieve the previous frame image data from the memory and decompress the previous frame image data for further processing with the decompressed current frame image data.

12. The system of claim 9, wherein the interpolation circuitry comprises a plurality of lookup tables including the single lookup table.

13. The system of claim 12, wherein the interpolation circuitry is configured to select the single lookup table from the plurality of lookup tables based on one or more parameters of an electronic device comprising the interpolation circuitry.

14. The system of claim 13, wherein the one or more parameters comprises a refresh rate of the display panel of the electronic device or a temperature of the electronic device.

15. The system of claim 14 comprising the display panel, wherein the display panel comprises an organic light emitting diode display or a liquid crystal display.

16. The system of claim 12, wherein interpolation circuitry comprises:
    a first stage configured to select the single lookup table and an additional lookup table from the plurality of lookup tables to output two or more interpolated values, wherein the selection is based at least in part on a first parameter; and
    a second stage configured to receive the two or more interpolated values and to interpolate an output value from the two or more interpolated values based at least in part on a second parameter.

17. The system of claim 16, wherein the first parameter comprises a refresh rate of the display panel, and the second parameter comprises a temperature.

18. A system comprising:
    a lookup table comprising:
    a first region that includes positive values, wherein the first region is to be interpolated using a first interpolation type;
    a second region that includes negative values, wherein the second region is to be interpolated using the first interpolation type; and
    a third region that includes positive and negative values, wherein the third region is to be interpolated using a second interpolation type; and
    display driving circuitry configured to drive a display panel based at least in part on the positive or negative values of the lookup table.

19. The system of claim 18, wherein the first interpolation type comprises bilinear interpolation.

20. The system of claim 18, wherein the second interpolation type comprises barycentric interpolation.

21. The system of claim 18, wherein the positive values and the negative values comprise overdrive values indicating how much to overdrive a pixel based at least in part on current frame data and previous frame data.

22. The system of claim 21, wherein the overdrive values are also based at least in part on a refresh rate of the display panel or a temperature of an electronic device that includes the display panel.

* * * * *